United States Patent Office.

JOHN DEANE, OF CONNEAUT, OHIO.

*Letters Patent No. 72,613, dated December 24, 1867.*

IMPROVEMENT IN PROCESS OF FUMIGATION FOR DESTROYING INSECTS ON HOP-VINES AND OTHER PLANTS.

*The Schedule referred to in these Letters Patent and making part of the same.*

TO ALL WHOM IT MAY CONCERN:

Be it known that I, JOHN DEANE, of Conneaut, in the county of Ashtabula, and State of Ohio, have invented a new and useful Mode of Destroying Insects on Hop-Vines, Grape-Vines, and other vegetation; and I do hereby declare that the following is a full, clear, and exact description of the same.

My invention is intended chiefly for application to the destruction of the small insects, which, feeding upon the leaves of hop and grape-vines, so greatly injure them as often entirely to destroy them. For this purpose I employ thorough fumigation, by the following composition burned under or in near proximity to the vines:

I mix the leaves of tobacco with sulphur and hellebore, add a small quantity of phosphorus, and incorporate the mixture with coal-tar. The precise quantity of each of the respective ingredients is not important, and need not be stated.

The composition is highly inflammable, and being burned, will emit a dense smoke, which will kill the insects exposed to its action. By this means I have been able to raise good crops of hops in neighborhoods where all other crops were either greatly injured or entirely destroyed.

What I claim as my invention, and desire to secure by Letters Patent, is—

The mode of destroying insects by fumigation with the smoke evolved by burning a mixture, compounded substantially as set forth, in proximity to hop or grape-vines.

In testimony whereof, I have signed my name to this specification in the presence of two subscribing witnesses.

JOHN DEANE.

Witnesses:
    CELIA H. GODDARD,
    ANNA KOZISEK,
    C. R. GODDARD.